US006988949B2

(12) United States Patent
Wang

(10) Patent No.: US 6,988,949 B2
(45) Date of Patent: Jan. 24, 2006

(54) CONSTANT VELOCITY JOINT VENT VALVE

(75) Inventor: Shen-Ling Allen Wang, Northville, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 201 days.

(21) Appl. No.: 10/703,347

(22) Filed: Nov. 7, 2003

(65) Prior Publication Data

US 2005/0101390 A1    May 12, 2005

(51) Int. Cl.
*F16D 3/224* (2006.01)
*F16K 15/14* (2006.01)

(52) U.S. Cl. .................. 464/17; 464/15; 464/902; 137/512.15; 137/854

(58) Field of Classification Search .................. 464/15, 464/17, 139–146, 902, 906, 185; 137/512, 137/512.1, 512.15, 854, 855
See application file for complete search history.

(56) References Cited

U.S. PATENT DOCUMENTS

| | | | | |
|---|---|---|---|---|
| 2,769,457 A | * | 11/1956 | Wittenberg | ................. 137/512 |
| 3,454,182 A | * | 7/1969 | Morton | ....................... 220/374 |
| 4,508,522 A | * | 4/1985 | Numazawa et al. | .......... 464/11 |
| 5,027,784 A | * | 7/1991 | Osawa et al. | ............... 123/572 |
| 6,179,717 B1 | | 1/2001 | Schwarzler | |
| 6,220,967 B1 | | 4/2001 | Miller | |
| 6,540,616 B2 | | 4/2003 | Miller et al. | |
| 2002/0025854 A1 | | 2/2002 | Miller et al. | |

* cited by examiner

*Primary Examiner*—Kenneth Thompson
(74) *Attorney, Agent, or Firm*—Jennifer M. Brumbaugh; Mick A. Nylander

(57) ABSTRACT

A vent valve for use in a constant velocity joint having a vent aperture in communication with a joint chamber comprises a body having a first end and a second end and at least one flat extending therebetween; and an umbrella shaped flexible retention cap disposed adjacent the first end of the body and the at least one flat. The retention cap is operative in a normally closed position to cover the at least one flat and seal the joint from external contaminants, and in response to internal pressure created in the joint cavity, functions to bellow outward and expose the at least one flat to permit air to escape from the chamber. The at least one flat includes a straight-line vent to clean the grease off and away from the vent valve. The vent valve can be made from single or multiple materials, having porous and non-porous properties.

23 Claims, 4 Drawing Sheets

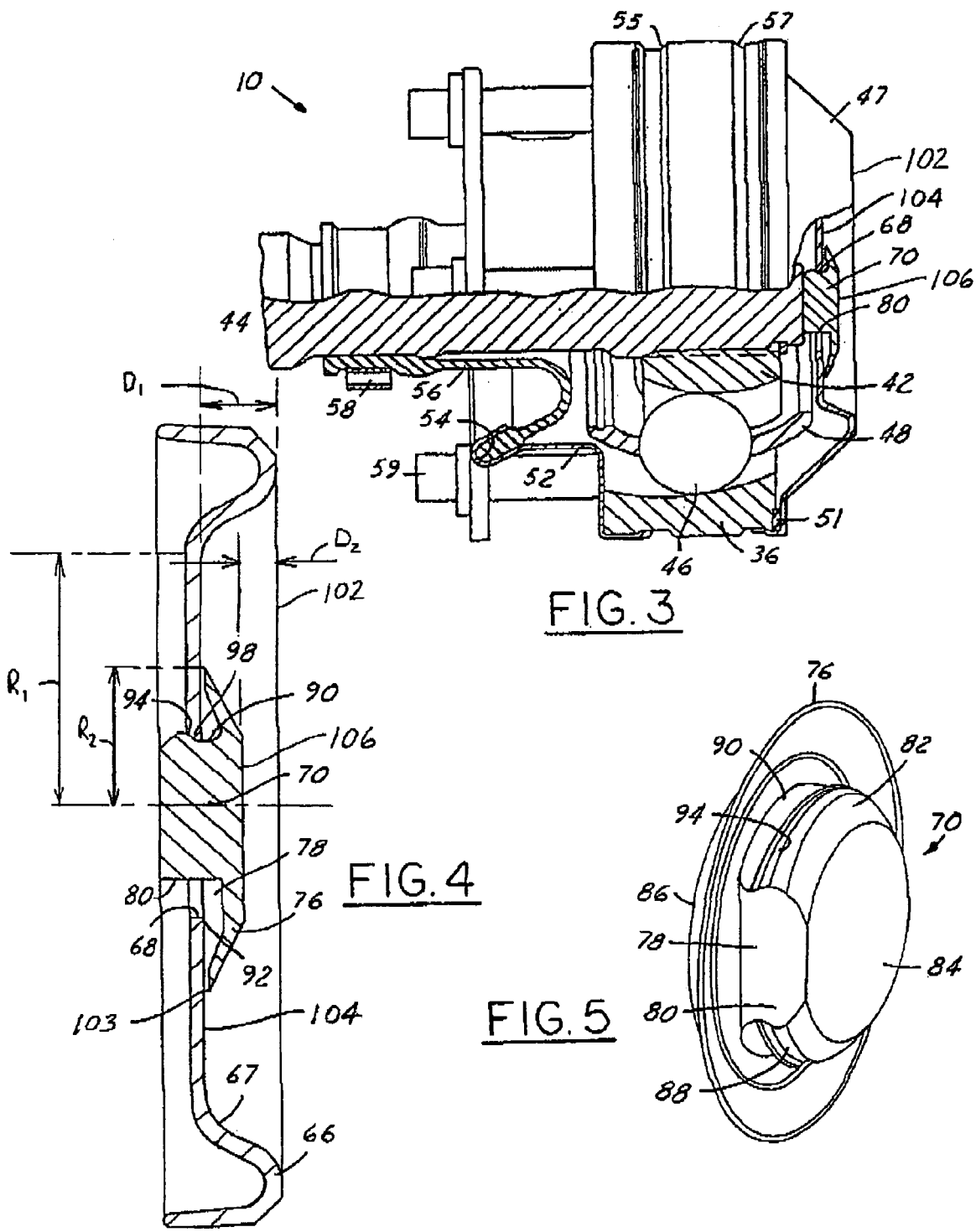

CONSTANT VELOCITY JOINT VENT VALVE

TECHNICAL FIELD

The present invention generally relates to constant velocity joints and more particularly, to a vent for a constant velocity joint.

BACKGROUND OF THE INVENTION

Constant velocity joints are common components in automotive vehicles. Typically, constant velocity joints are employed where transmission of a constant velocity rotary motion is desired or required. Common types of constant velocity joints are a plunging tripod, a fixed tripod, a plunging ball joint and a fixed ball joint. These types of joints currently are used in front wheel drive vehicles, or rear wheel drive vehicles, and on the propeller shafts found in rear wheel drive, all wheel drive and four wheel drive vehicles. These constant velocity joints are generally grease lubricated for life and sealed by the use of sealing boots when used on drive shafts. Thus, constant velocity joints are sealed in order to retain grease inside the joint while keeping contaminants and foreign matter, such as dirt and water, out of the joint. To achieve this protection, the constant velocity joint is usually enclosed at the open end of the outer race by a sealing boot made of a rubber, thermoplastic, or silicone material. The opposite end of the outer race generally is enclosed by a dome or cap, known as a grease cap in the case of a disk type joint. A monoblock or integral stem and race design style does not use a grease cap, but is sealed by the internal geometry of the outer race. This sealing and protection of the constant velocity joint is necessary because contamination of the inner chamber may cause internal damage and destruction of the joint. Furthermore, once the inner chamber of the joint is lubricated, it is lubricated for life.

During operation, the constant velocity joint creates internal pressures in the inner chamber of the joint. These pressures have to be vented to the outer atmosphere in order to prevent pressure build-up which occurs during operation of the joint and which may destroy the boot. If the pressure build-up is allowed to reach a critical state, the boot, protecting the joint from contaminants and water, may crack and deteriorate, or blow out, thus losing its sealing capability. Generally speaking, a constant velocity joint is usually vented by placing a small hole generally in the center of the grease cap or at least one hole around the outer periphery of the outer race. These prior methods of venting the gas are sometimes not adequate because if the constant velocity joint is in a static state and not rotating the lubricating grease may settle in the vent hole and block or hinder its function of venting any internal gas pressure. In addition, the vent hole may become blocked by the lubricating grease while the constant velocity joint is rotating or in a dynamic state. Furthermore, the lubricating grease may be purged or excreted into the external environment if the grease communicates with the vent hole. This type of vent hole may also allow the infiltration of contaminants. If the vent hole becomes blocked, the internal pressure may build up causing the joint seal to fail due to a ruptured boot or other catastrophe. Furthermore, the constant velocity joint, after running for long periods of time, creates very high temperatures along with high pressures which are vented through the current vent holes. However, if the constant velocity joint is submerged, splashed, or saturated in water or other contaminants, the water will, via vacuum caused by the temperature differential or by gravity, be sucked into the constant velocity joint chamber, thus contaminating the grease lubricant and reducing the life of the constant velocity joint. Therefore, the ingress of water and other contaminants and egress of joint grease through the vent hole may reduce the life expectancy for the constant velocity joints.

Therefore, there is a need in the art for a constant velocity joint vent valve that will prevent the build up of internal gas pressure while eliminating the ingress of contaminants and preventing the egress of joint grease, and provide a vent pathway that is not subject to plugging or occlusion by the joint grease. There is also an additional need to have a constant velocity joint vent valve that, upon pressure differential reversal, will diffuse or permeate air back into the constant velocity joint chamber while keeping external contaminants out of the joint.

SUMMARY OF THE INVENTION

The present invention provides a constant velocity joint vent valve that protects the internal joint cavity and joint grease from internal overpressure and external contaminants. The present invention allows expanding internal gases to vent to the external environment while protecting against external contaminants. The vent valve according to the present invention is self-cleaning and resistant to plugging. The vent valve prevents the escape of grease from the internal cavity while maintaining an open vent pathway to release internal pressure. The vent valve can also be gas permeable to allow external gas or air into the constant velocity joint chamber equalizing the pressure while keeping external contaminants out of the joint.

The present invention also describes a venting constant velocity joint system comprising a constant velocity joint having a vent aperture in communication with an internal joint chamber. The vent aperture may be provided directly in the joint (e.g. in a grease cap), or any suitable component thereof, such as, for example, a vent plate commonly used in mono-block designs. The system further includes a vent valve receivable in the vent aperture. The vent valve comprises a body and at least one straight-line vent or flat, the at least one straight-line vent provides an escape pathway. The body comprises a first end and a second end, the second end being a flexible retention cap. In operation, the flexible retention cap covers the straight-line vent and seals the joint from external contaminants in a normally closed position. In response to internal pressure created in the joint cavity, the retention cap opens and exposes the straight-line vent to permit air to escape from the internal constant velocity joint chamber through the escape pathway into the external environment. The straight-line vent prevents grease from plugging the escape pathway by removing the grease from the vent opening. The straight-line vent removes the grease, while under the influence of centrifugal forces caused by the spinning of the constant velocity joint, to the outer most surface of the annular lip of the first end of the body of the vent valve or completely therefrom.

Further to the self-cleaning nature of the vent valve to prevent plugging, is the permeable nature of the vent valve itself. When the vent valve is made of a gas permeable material, the vent valve will allow for the reintroduction of gas back into the constant velocity joint chamber upon cooling or a decrease of internal pressure in the joint. The permeable material will allow the gas into the internal constant velocity joint chamber while keeping water and other contaminates out. Also the permeable material will enable the residual grease, left upon the vent valve, to be purged partially back into the constant velocity joint chamber. The permeable material will further lessen the build-up of grease upon the vent valve. The permeable material releases or liberates the grease from the internal surface of the vent valve as the gas is permeated through it.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 3 shows a cross section of another exemplary constant velocity joint with a vent valve according to an embodiment of the present invention.

FIG. 4 shows a cross section of the vent according to an embodiment of the present invention.

FIG. 5 shows an isometric view of the vent valve of FIG. 4.

DETAILED DESCRIPTION

Figure 1:
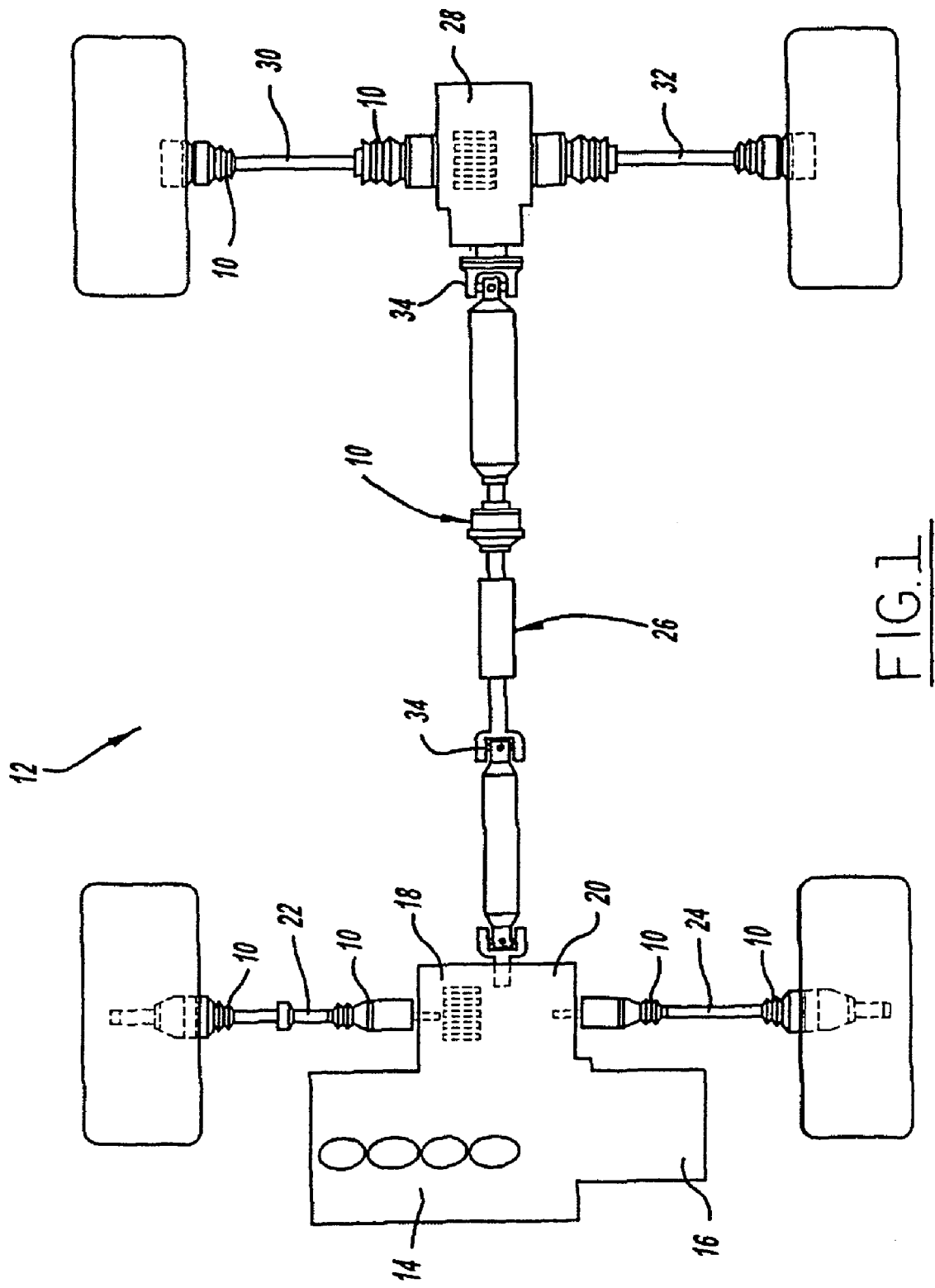
FIG. 1 shows a plan view of an all wheel drive vehicle driveline wherein the present vent valve may be used to advantage.

Referring to the drawings, a constant velocity joint 10 including a vent valve according to the present invention is shown. It should be noted that any type of constant velocity joint such as a plunging tripod, a fixed tripod, etc. having any style such as a monoblock, a disk, a Rzeppa, etc. may be used in combination with to the present vent valve. The vent valve of the present invention provides a novel and improved method of venting the joint to prevent grease from plugging the vent valve, and allows pressurizing the internal constant velocity joint chamber to bring it into pressure equilibrium with the external environment.

FIG. 1 shows a plan view of an all wheel drive vehicle drive line wherein the present vent valve may be used to advantage. The drive line 12 shown in FIG. 1 is a typical all wheel drive vehicle driveline. However it should be noted that other vehicle drivelines employing vented constant velocity joints can also be improved with the present vent valve including rear wheel drive only vehicles, front wheel drive only vehicles, all wheel drive vehicles, and four wheel drive vehicles. In this example, the drive line 12 includes an engine 14 that is connected to a transmission 16 and a power take off unit 18. The front differential 20 has a right hand side half shaft 22 and left hand side half shaft 24 each of which are connected to a wheel and deliver power to the wheels. On both ends of the right hand side half shaft 22 and left hand side half shaft 24 are constant velocity joints 10. A propeller shaft 26 connects the front differential 20 to the rear differential 28, wherein the rear differential 28 includes a rear right hand side shaft 30 and a rear left hand side shaft 32, each of which ends with a wheel on one end thereof. A constant velocity joint 10 is located on both ends of the half shaft that connect to the wheel and the rear differential 28. The propeller shaft 26, shown in FIG. 1, is a three-piece propeller shaft that includes a plurality of cardan joints 34 and one high-speed constant velocity joint 10. The constant velocity joints 10 transmit power to the wheels through the propeller shaft 26 even if the wheels or the propeller shaft 26 have changing angles due to steering, raising or lowering of the suspension of the vehicle. The constant velocity joints 10 may be of any of the standards types known, such as a plunging tripod, the cross groove joint, a fixed joint, a fixed tripod joint, or double off set joint, all of which are commonly known terms in the art for different varieties of constant velocity joints 10. The constant velocity joints 10 allow for transmission of constant velocities at angles which are found in every day driving of automotive vehicles in both the half shafts and propeller shafts of these vehicles.

Figure 2:
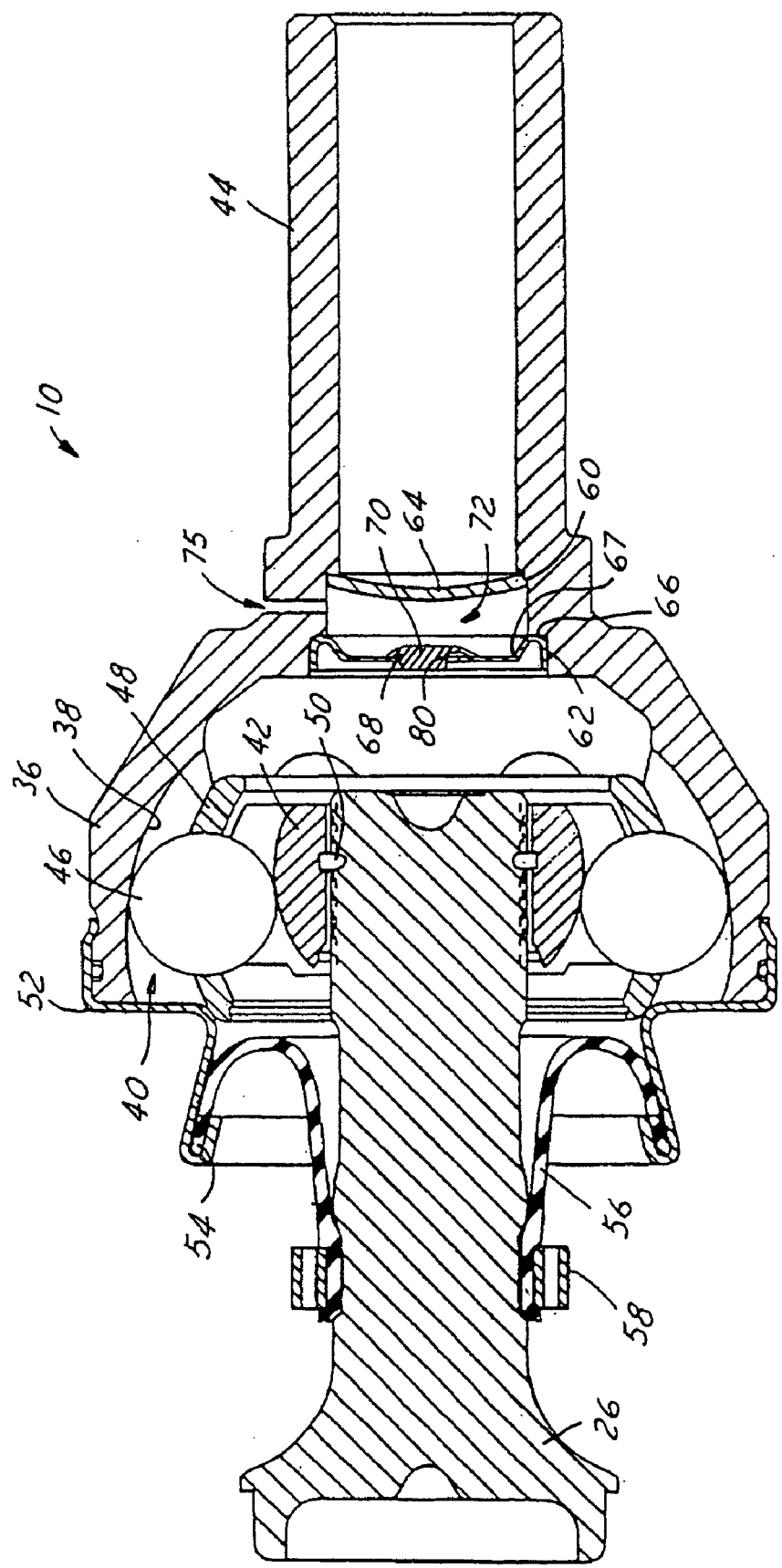
FIG. 2 shows a cross section of an exemplary constant velocity joint with a vent valve according to an embodiment of the present invention.

FIG. 2 shows a cross section of an exemplary constant velocity joint with a vent valve according to an embodiment of the present invention. The constant velocity joint 10 is a fixed constant velocity joint of the monoblock style and is generally used in the propeller shaft 26 in an all wheel drive vehicle. It should be noted that any other type of constant velocity joint may also be used for the present invention. An inner wall 38 of the outer race 36 generally defines a constant velocity joint chamber 40. An inner race 42 is located or housed within the outer race 36. The inner race 42 is connected to the drive shaft or propeller shaft 26 of the vehicle. A ball or rolling element 46 is located between an outer surface of the inner race 42 and the inner wall 38 of the outer race 36. The ball 46 is held in position between the outer race 36 and inner race 42 surfaces by a cage 48. The rotation of the outer race 36 will rotate the inner race 42 at the same or constant speed thus allowing for constant velocity to flow through the joint between the propeller shaft 26 and the power take off unit 18 that is angled up to a predetermined fixed angle. The constant velocity joint 10 will allow the angle to change because the balls 46 will be able to rotate and compensate for any difference in the angle between the shafts by moving within the outer race 36 and inner race 42 track formations.

A snap ring retainer 50 is located on an inside surface of the inner race 42 to allow for a connection of the propeller shaft 26 to the inner race 42. A boot cover 52 is connected to the outer surface of the outer race 36. One end of the boot cover 52 has a channel 54 that extends along the entire periphery of the boot cover 52. The boot 56 is secured within the channel 54 of the boot cover 52 while the other end engages the drive shaft 26 and is held in place by a boot clamp 58. The boot 56 seals the constant velocity joint 10 from any outside contaminants, such as water, dirt and road grime. The design of the boot 56 allows for a seal interface through any angle of inclination that the propeller shaft or half shafts may encounter during normal driving operations.

An interior surface of the outer race 36 includes a first shoulder portion 60 and a second shoulder portion 62. The first shoulder portion 60 includes a first plug or cover 64 and seals the outer race 36 and chamber 40 from transmission oils or contaminants of the transmission. In contact with the second shoulder 62 of the outer race is a vent plate or cover 66 which in the preferred embodiment is made of metal, but may be made of any other type of ceramic or hard plastic or other metal composite material depending on the needs and design requirements of the constant velocity joint 10. The vent plate 66 includes an vent aperture or orifice 68 located at or near the center thereof which will allow for securing of the vent valve 70 in the constant velocity joint 10. The first plug 64 and vent plate 66 form a second chamber 72 adjacent to the first chamber 40 formed by the outer race 36 of the constant velocity joint 10. A second orifice 75 is located through the outer race to vent the second chamber 72 to the atmosphere or external environment. This allows the gas to pass through the vent plate or second plug 66 to be vented to the atmosphere through the second orifice 75, which is located through the outer race surface. Located within the orifice of the vent plate 66 and adjacent to the first plug 64 within the second chamber 72 is a vent valve 70 according to the present invention. The vent valve 70 has a straight-line vent or flat area vent 80. The straight-line vent 80 prevents plugging by fill fluid or joint grease by extricating or spinning, under the action of centrifugal forces, the joint grease off of the inner portion of the vent valve 70 or completely therefrom, clearing the vent pathway.

FIG. 3 shows a cross section of another exemplary constant velocity joint with a vent valve according to an embodiment of the present invention. The constant velocity joint 10 is a fixed constant velocity joint of the disk type and is generally used in the half shaft in an all wheel drive or front wheel drive vehicle. The constant velocity joint 10 includes an outer race 36 that has an inner race 42 located within its circumference. An inner wall 38 of the outer race 36 generally defines a constant velocity joint chamber 40. The inner race 42 is connected to a shaft 44. A ball 46 is in contact with both the inner surface of the outer race 36 and an outer surface of the inner race 42. The ball 46 is held in place by a cage 48. On one end of the outer race 36 is located an end cap 47. The end cap 47 includes a vent aperture or orifice 68 at or near a center portion thereof. A seal 51 is located between the end cap 47 and the outer race 36. An outside surface of the outer race 36 also includes two grooves 55, 57 therein. The first groove 55 receives an end of the end cap 47 and allows for crimping of the end cap onto the outer race 36. On the opposite end of the outer race 36 is located the boot cover 52 which is crimped into the second groove 57 on the outer race surface. The boot cover 52 includes a channel 54 on a periphery thereof. Within the channel 54 is one end of the boot 56 which is made of a neoprene material, however, it should be noted that any other type of soft rubber like or composite material may also be used. The opposite end of the boot 56 is secured to the shaft 44 by a boot clamp 58 or other available securing methods. A plurality of fasteners 59 are used to hold the outer race 36 to a body of the constant velocity joint 10.

The end cap 47 of this embodiment is made of metal, but may be made of any other type of ceramic or hard plastic or other metal composite material depending on the needs and design requirements of the constant velocity joint 10. The end cap 47 includes a vent aperture or orifice 68 located at or near the center thereof which will allow for securing of the vent valve 70 in the constant velocity joint 10. The vent valve 70 allows gas to pass through the vent aperture 68 from the constant velocity joint chamber 40 to the atmosphere. Located within the vent aperture 68 of the end cap 47 is a vent valve 70 according to the present invention. The vent valve 70 has a straight-line vent or flat area vent 80. The straight-line vent 80 prevents plugging by fill fluid or joint grease by extricating or spinning, under the action of centrifugal forces, the joint grease off of the inner portion of the vent valve 70 or completely therefrom, clearing the vent pathway.

The end cap 47 having a vent aperture 68 for receiving the vent valve 70 of FIG. 3 serves a similar function as the vent plate 66 having a vent aperture 68 for receiving the vent valve 70 of FIG. 2. Other embodiments having a vent aperture for receiving the vent valve are also included within the scope of this invention.

FIG. 4 shows a cross section of the vent according to an embodiment of the present invention. A vent plate 66 within a constant velocity joint such as in FIG. 2, defines a vent aperture 68 adapted to receive the vent valve 70. Vent plate 66 may be any suitable size or shape depending on the application requirements for venting a constant velocity joint. The vent plate 66 may have a recessed portion or offset 67 having a depth sufficient to protect the vent valve 70 from unwanted contact, or the vent plate 66 may be flat (not shown) which would provide no inherent protection to the vent valve. However, in the embodiment shown, venting plate 66 comprises an annular member adapted to be disposed in the second shoulder portion 62 and a recessed portion 67 of constant velocity joint 10, as shown in FIG. 2. As can best be seen with reference to FIGS. 3 and 4, the end cap 47 or vent plate 66 can include a recess or offset 67 formed in the end face of the cap 47 or plate 66. The vent plate 66 or end cap 47 can thus be formed such that the flexible retention cap 76 is recessed in the axial direction with respect to the outermost surface 102 of the vent plate 66 or cap 47. In this example, the recess 67 is formed such that a first distance $D_1$ exists between the outermost surface 102 and end face 104 which includes the ventaperture 68 for receiving the vent valve 70. The recess 67 permits the outermost surface 106 of the flexible retention cap 76 to be located at or below the outermost surface 102 of the cap 47 or plate 66. That is, the distance $D_2$ is greater than or equal to zero. This feature protects the vent valve 70 from undesired contact thereby preventing the vent valve 70 from becoming dislodged or comprised. The radius $R_1$ of the recess 67 is also at least slightly greater than the radius $R_2$ formed by the edge 103 of the flexible retention cap 76. In this way, the vent valve 70 can be positioned within a protective pocket recessed from the end surface 102 of the end cap 47 or vent plate 66.

Referring to FIGS. 4 and 5, the vent valve 70 comprises a body 82 having a first end 84 and a second end 86, and at least one straight-line vent 80 axially extending therebetween creating an escape pathway 78. Vent valve 70 further includes a flexible retention cap 76 disposed adjacent the first end 84 of the body 82 and the at least one straight-line vent 80. Retention cap 76 is preferably, but not necessarily, umbrella shaped having a surface area which exceeds and covers the area of vent aperture 68 when the vent valve 70 is disposed in the vent plate 66.

The at least one straight-line vent 80 may be any suitable size or shape, so long as it creates an escape pathway 78. The straight-line vent 80 is generally a flat, which is axially disposed in the outer surface 88 of body 82 of vent valve 70. More specifically, straight-line vent 80 is preferably, but not necessarily, a single flat plane tangentially located having an inclination that aligns with the axial line created between the first end 84 and the second end 86 located on the outer surface 88 of body 82. The inclination of the straight-line vent 80 in the preferred embodiment would be parallel to the axial line created between the first end 84 and the second end 86. Although, in a different embodiment shown in FIG. 7, the inclination could also be such that the straight-line vent 81 is not parallel to the axial line, e.g. a tilt is placed upon the straight-line vent 81. Straight-line vents 80, 81 could comprise more than one flat plane that intersect each other or lie separately on the outer surface 88 of the body 82.

The use of a pliable material for the vent valve 70 will allow for the complete closure of the flexible retention cap 76 thus blocking the entry of contaminants into the constant velocity joint chamber 40 while also allowing for easy opening of the flexible retention cap 76 allow for exiting high pressure gas to the atmosphere.

Body 82 further includes an annular channel 90 defining an annular engagement surface 92 and an annular lip 94 having a surface area (or diameter) which sufficiently exceeds that of vent aperture 68 such that vent valve 70 may be press-fitted and retained in vent aperture 68. Specifically, engagement surface 92 contacts the inner wall 96 of vent aperture 68 and is retained by top surface 98 on annular lip 94. Vent valve 70 is manufactured from substantially rigid but pliable material, such as thermoplastic elastomer, fluoro silicone or rubber. Vent valve 70 can be made from single material or a combination of materials having non-permeable or gas permeable characteristics. An example of a gas permeable material is nylon or expanded polytetrafluoroethylene polymer that is saturated with an oleo phobic polymer to create a barrier that will allow for the passage of pressurized gas through the vent valve 70.

Figure 6:
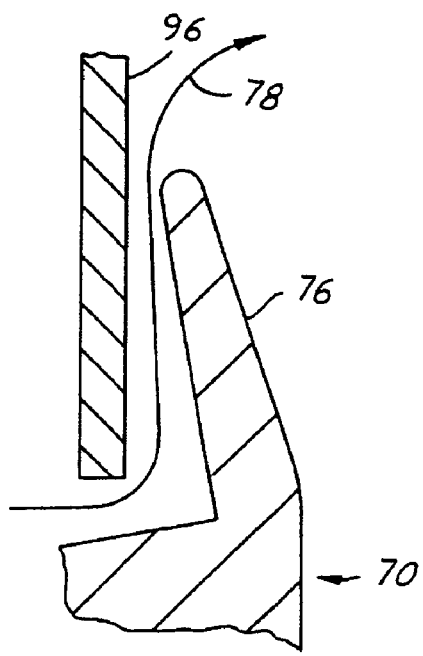
FIG. 6 shows a schematic diagram of a detail of a vent valve of the present invention in an open position in response to an internal overpressure condition.

In operation, as shown in greater detail in FIG. 4, the retention cap 76 is in a normally closed position and functions to cover the escape pathway 78 and seal the constant velocity joint chamber 40, and more particularly the vent aperture 68, from external contaminants which may inhibit joint operation. In response to internal pressure created in the constant velocity joint chamber from grease volatility, high operating temperatures, etc., the retention cap 76 opens (e.g. bellows outward) as shown in FIG. 6 to expose escape pathway 78 to the external pressure (and generally lower air pressure conditions). This permits air to escape from the constant velocity joint chamber 40 through escape pathway 78 into the external atmosphere and thus relieve the joint overpressure condition. Once the overpressure is release from the constant velocity joint chamber 40, then the flexible retention cap seats against the inner wall 96 of the vent plate 66 and seals the constant velocity joint chamber from water and other unwanted contaminants.

The material of the vent valve 70 can be non-permeable or gas permeable, or any combination thereof. A non-permeable vent valve 70 will not let gas back into the constant velocity joint chamber 40 when the chamber 40 has a lower pressure than the external environment to which the vent valve 70 vents. A gas permeable material, or combination thereof, will allow for re-pressurization of the constant velocity joint chamber 40 when a pressure imbalance exists between the external and internal pressures. The gas permeable material has the added effect of keeping out water and other contaminates while letting gas back into the chamber to bring it to pressure equilibrium. In addition, as the gas diffuses through the gas permeable material, the gas cleans and liberates the grease from off of the inside portion of the first end 84 of body 82 of vent valve 70. The permeable material is ideal for plunging type constant velocity joints where the pressure differential reverses more frequently.

Figure 7:
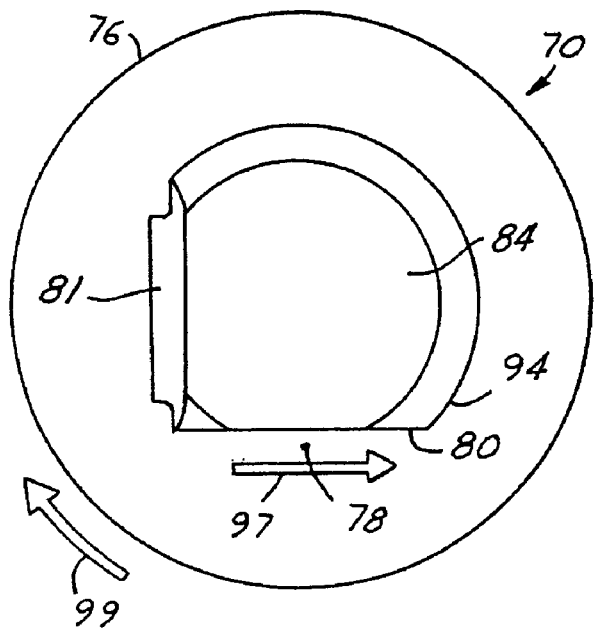
FIG. 7 shows a schematic diagram of a vent valve of the present invention in a rotational mode wherein the centrifugal force migrates the grease away from the vent hole.

FIG. 7 shows a schematic diagram of a vent valve of the present invention in a rotational mode wherein the centrifugal force migrates the grease away from the vent hole. The straight-line vent will prevent or minimize grease leakage due to its unique characteristic. The vent valve 70 has a straight-line vent or flat area vent 80. The straight-line vent 80 prevents plugging by fill fluid or joint grease by extricating or spinning, under the action of centrifugal forces, the joint grease off of the inner portion of the vent valve 70 or completely therefrom, clearing the vent pathway. Under static conditions, the joint grease is retained in the constant velocity joint chamber 40 by the retention force of the flexible retention cap 76 of the body 82 of the vent valve 70. Under dynamic conditions, the vent valve 70 is rotated in the direction of arrow 99 by the constant velocity joint 10. The rotation or spinning of the vent valve 70 creates centrifugal forces that act upon and migrate the grease outward toward the annular lip 94 of the first end 84 of the vent valve 70. The grease that is upon the straight-line vent 80 that restricts or blocks the escape pathway 78 is migrated in the direction of arrow 97 toward and onto annular lip 94 by the centrifugal forces acting in the opposite direction of the rotation. In other embodiments, the migration of the grease may be in the same direction of rotation 99, resulting in clearing and cleaning of the grease from off of the escape pathway 78. The grease is excreted back into the constant velocity joint chamber 40 from off of the straight-line vent 80 and annular lip 94, allowing the escape pathway 78 to freely vent the overpressure gas from within the chamber 40 without the release of joint grease into the external environment. There may be more than one straight-line vent 80, 81.

Figure 8:
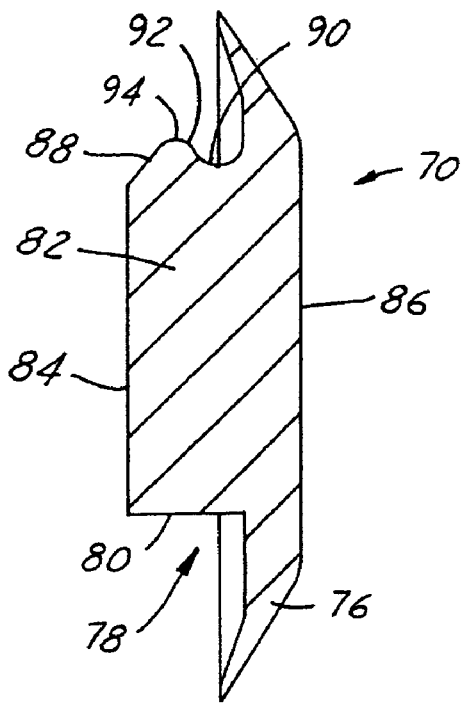
FIG. 8 shows a cross section of the vent valve according to the present invention.

FIG. 8 shows a cross section of the vent valve according to the present invention. The vent valve 70 is for use in a constant velocity joint and is comprised of a body 82 and a flexible retention cap 76. The body 82 has a cylindrical outer surface 88, a first end 84 and a second end 86, wherein at least one straight-line vent 80 is located in the outer surface 88 and extends from the first end 84 to between the first end 84 and the second end 86. The outer surface 88 has an annular lip 94 located adjacent the first end 84, an annular channel 90 located between the annular lip 94 and the second end 86, and an annular engagement surface 92 located on the annular lip 94 toward the annular channel 90. A vent pathway 78 is formed by the at least one straight-line vent 80 and the annular channel 90.

The flexible retention cap 76 is disposed between the annular channel 90 and the second end 86 of the body 82. The flexible retention cap 76 is umbrella shaped and covers the annular channel 90. It is larger than the annular lip 94, which is larger than the annular channel 90. The at least one straight-line vent 80 is adapted to self clean the vent valve 70 under the influence of rotational forces and the vent valve 70 has a vent pathway 78 that is normally closed and seals a vent plate 66 between the flexible retention cap 76 and the annular engagement surface 92.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A vent valve comprising:
   a body having a first end and a second end and at least one straight-line vent extending therebetween; and
   a flexible retention cap disposed adjacent the first end of the body and the at least one straight-line vent, the straight-line vent being adapted to self clean the vent valve under the influence of rotational forces;
   wherein the body and the flexible retention cap are made from a combination of gas permeable and non-permeable materials.

2. The vent valve of claim 1, wherein the body and the flexible retention cap are made from a pliable material.

3. The vent valve of claim 1, wherein the body and the flexible retention cap are made from a fluoro silicone material.

4. The vent valve of claim 1, wherein the body and the flexible retention cap are gas permeable.

5. The vent valve of claim 1, wherein the at least one straight-line vent is one flat.

6. The vent valve of claim 1, wherein the at least one straight-line vent has a tilt extending along the body.

7. The vent valve of claim 1, wherein the flexible retention cap has an umbrella or a mushroom shape.

8. The vent valve of claim 4, wherein the body and the flexible retention cap are made from a polytetrafluoroethylene polymer.

9. The vent valve of claim 5 comprising two flats which intersect one another.

10. A constant velocity joint venting system comprising:
a constant velocity joint having an internal chamber and a vent plate defining a vent aperture in communication with the joint chamber; and a vent valve receivable in the vent aperture, the vent valve comprising:
a body having a first end and a second end and at least one straight-line vent extending therebetween; and
a flexible retention cap disposed adjacent the first end of the body and the at least one straight-line vent, the straight-line vent being adapted to self clean the vent valve under the influence of rotational forces.

11. The constant velocity joint venting system of claim 10, wherein the flexible retention cap has a surface area greater than the vent aperture.

12. The constant velocity joint venting system of claim 10, wherein the vent plate has an offset or a recessed portion.

13. The constant velocity joint venting system of claim 10, wherein the body and the flexible retention cap are made from a fluoro silicone material.

14. The constant velocity joint venting system of claim 10, wherein the body and the flexible retention cap are gas permeable.

15. The constant velocity joint venting system of claim 10, wherein the body and the flexible retention cap are made from a combination of gas permeable and non-permeable materials.

16. The constant velocity joint venting system of claim 10, wherein the at least one straight-line vent is one flat.

17. The constant velocity joint venting system of claim 10, wherein the at least one straight-line vent is inclined axially extending along the body.

18. The constant velocity joint venting system of claim 10, wherein the flexible retention cap has an umbrella or a mushroom shape.

19. The constant velocity joint venting system of claim 10, wherein the vent plate is formed such that the flexible retention cap is recessed in the axial direction with respect to an outermost surface of said vent plate.

20. The constant velocity Joint venting system of claim 12, wherein the recess or offset defines a first distance ($D_1$) between an outermost surface of the vent plate and an end face of the vent plate which includes the vent aperture, such that an outermost surface of said flexible retention cap sits at or below said outermost surface of said vent plate.

21. The constant velocity joint venting system of claim 12, wherein the recess or offset extends greater radially from said vent aperture than an outermost radial edge of said flexible retention cap.

22. The constant velocity joint venting system of claim 20, wherein the recess or offset extends greater radially from said vent aperture than an outermost radial edge of said flexible retention cap.

23. A vent valve for use in a constant velocity joint, comprising:
a body having a cylindrical outer surface, a first end and a second end;
at least one straight-line vent formed in the outer surface, and extends from the first end to the second end, the outer surface having an annular lip located adjacent the first end, an annular channel located between the annular lip and the second end, and an annular engagement surface located on the annular lip toward the annular channel, wherein a vent pathway is formed by the at least one straight-line vent and the annular channel; and
a flexible retention cap disposed between the annular channel and the second end of the body, wherein the flexible retention cap is umbrella shaped covering the annular channel and has a greater circumference than the annular lip which has a greater circumference than the annular channel,
wherein the at least one straight-line vent is adapted to self clean the vent valve under the influence of rotational forces.

* * * * *

UNITED STATES PATENT AND TRADEMARK OFFICE
CERTIFICATE OF CORRECTION

PATENT NO. : 6,988,949 B2  
DATED : January 24, 2006  
INVENTOR(S) : Shen-Ling Allen Wang It is certified that error appears in the above-identified patent and that said Letters Patent is hereby corrected as shown below:

<u>Column 6,</u>
Line 7, insert the following paragraph:

-- As can best be seen with reference to Figures 3 and 4, the end cap 47 or vent plate 66 can include a recess or offset 67 formed in the end face of the cap 47 or plate 66. The vent plate 66 or end cap 47 can thus be formed such that the flexible retention cap 76 is recessed in the axial direction with respect to the outermost surface 102 of the vent plate 66 or cap 47. In this example, the recess 67 is formed such that a first distance D1 exists between the outermost surface 102 and end face 104 which includes the vent aperture 68 for receiving the vent valve 70. The recess 67 permits the outermost surface 106 of the flexible retention cap 76 to be located at or below the outermost surface 102 of the cap 47 or plate 66. That is, the distance D2 is greater than or equal to zero. This feature protects the vent valve 70 from undesired contact thereby preventing the vent valve 70 from becoming dislodged or comprised. The radius R1 of the recess 67 is also at least slightly greater than the radius R2 formed by the edge 103 of the flexible retention cap 76. In this way, the vent valve 70 can be positioned within a protective pocket recessed from the end surface 102 of the end cap 47 or vent plate 66. --.

Signed and Sealed this

Eleventh Day of April, 2006

JON W. DUDAS  
*Director of the United States Patent and Trademark Office*